(12) United States Patent
Rolia et al.

(10) Patent No.: US 8,918,496 B2
(45) Date of Patent: Dec. 23, 2014

(54) SYSTEM AND METHOD FOR GENERATING SYNTHETIC WORKLOAD TRACES

(75) Inventors: Jerome Rolia, Fort Collins, CO (US); Daniel Gmach, Fort Collins, CO (US); Ludmila Cherkasova, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2014 days.

(21) Appl. No.: 11/742,525

(22) Filed: Apr. 30, 2007

(65) Prior Publication Data

US 2008/0270595 A1 Oct. 30, 2008

(51) Int. Cl.
G06F 15/173 (2006.01)
G06F 7/60 (2006.01)
G06F 11/34 (2006.01)
G06F 11/263 (2006.01)

(52) U.S. Cl.
CPC .......... *G06F 11/263* (2013.01); *G06F 11/3414* (2013.01)
USPC .............................................. 709/224; 703/2

(58) Field of Classification Search
USPC ........... 709/201–203, 217–229; 718/100–108
See application file for complete search history.

(56) References Cited

U.S. PATENT DOCUMENTS

| | | | |
|---|---|---|---|
| 5,345,579 A * | 9/1994 | Hynes | 703/2 |
| 5,668,995 A | 9/1997 | Bhat | |
| 6,738,736 B1 * | 5/2004 | Bond | 703/2 |
| 6,862,623 B1 | 3/2005 | Odhner et al. | |
| 6,898,564 B1 | 5/2005 | Odhner et al. | |
| 7,002,960 B1 | 2/2006 | Golan et al. | |
| 7,082,441 B1 | 7/2006 | Zahavi et al. | |
| 7,117,118 B2 | 10/2006 | Kalos et al. | |
| 7,167,821 B2 * | 1/2007 | Hardwick et al. | 703/22 |
| 7,171,668 B2 | 1/2007 | Molloy et al. | |
| 7,571,088 B2 * | 8/2009 | Papaefstathiou et al. | 703/16 |
| 2002/0198749 A1 | 12/2002 | Tomlin et al. | |
| 2003/0225563 A1 | 12/2003 | Gonos | |
| 2005/0005012 A1 | 1/2005 | Odhner et al. | |
| 2005/0102121 A1 | 5/2005 | Odhner et al. | |
| 2005/0102318 A1 | 5/2005 | Odhner et al. | |
| 2005/0108380 A1 | 5/2005 | Odhner et al. | |
| 2005/0138170 A1 | 6/2005 | Cherkasova et al. | |
| 2005/0278439 A1 | 12/2005 | Cherkasova | |
| 2005/0278453 A1 | 12/2005 | Cherkasova | |
| 2006/0013134 A1 | 1/2006 | Neuse | |
| 2006/0089982 A1 | 4/2006 | Abbott et al. | |
| 2006/0235664 A1 | 10/2006 | Vinberg et al. | |

OTHER PUBLICATIONS

U.S. Appl. No. 11/742,525, filed Apr. 30, 2007, Rolia et al.
U.S. Appl. No. 11/742,519, Rolia et al.
U.S. Appl. No. 11/742,530, Rolia et al.
U.S. Appl. No. 11/684,569, Cherkasova et al.
U.S. Appl. No. 11/935,196, Cherkasova et al.
U.S. Appl. No. 11/546,632.
U.S. Appl. No. 11/492,738.

(Continued)

Primary Examiner — Afshawn Towfighi

(57) ABSTRACT

A method comprises receiving a pattern of resource demands in a workload trace. The method further comprises identifying a plurality of occurrences of the determined pattern in the workload trace, and analyzing the occurrences to determine a trend of the workload trace. The method further comprises generating at least one synthetic workload trace representative of expected resource demands of the received workload trace accounting for the determined trend.

20 Claims, 8 Drawing Sheets

(56) References Cited

OTHER PUBLICATIONS

"Capacity Planning for WebLogic Portal," URL: http://edocs.bea.com/wlp/docs81/capacityplanning/capacityplanning.html, May 21, 2007.
"The Workload for the SPECweb96 Benchmark," URL: http://www.spec.org/osg/web96/workload.html, Standard Performance Evaluation Corporation, May 21, 2007.
"TPC-W Benchmark," URL http://www.tpc.org, Jun. 4, 2007.
Almeida, V., Bestavros, A., Crovella, M., de Oliveira, A., "Characterizing Reference Locality in the WWW," Technical Report, Boston University, TR-96-11, 1996.
Arlitt, M. and Williamson, C., "Web Server Workload Characterization: The Search for Invariants (Extended Version)," Department of Computer Science, University of Saskatchewan, 57 Campus Drive, Saskatoon, SK, Canada S7N 5A9, Mar. 15, 1996.
Arlitt, M. and Williamson, C., "Web Server Workload Characterization: The Search for Invariants," Department of Computer Science, University of Saskatchewan, SIGMETRICS '96 May 1996 PA, pp. 126-137.
Arlitt, M., Krishnamurthy, D., and Rolla, J., "Characterizing the Scalability of a Large Web-based Shopping System," ACM Transactions on Internet Technology, vol. 1. N 1, pp. 44-69, Aug. 2001.
Box, G.E.P., and G. Jenkins and G. Reinsel; "Time Series Analysis: Forecasting and Control;" Prentice Hall, Upper Saddle River, NJ, USA, 3rd Edition, 1994.
Chakravarti, I., Laha, R., and Roy, J, "Handbook of Methods of Applied Statistics," vol. I, John Wiley and Sons, pp. 392-394, 1967.
Chase, J.S., Anderson, D., Thakar, P., Vandat, A. and Doyle, R., "Managing Energy and Server Resources in Hosting Centers," Department of Computer Science, Duke University.
Cherkasova, L. and Tang, L., "Sizing the Streaming Media Cluster Solution for a Given Workload," In Proc. of the 4th IEEE/ACM CCGrid 2004, Chicago, USA, Apr. 2004.
Draper, N. R. and H. Smith, "*Applied Regression Analysis*;" John Wiley & Sons, New York, NY, USA, 3rd Ed., 1998.
Engle, R.F., "Autoregressive Conditional Heteroscedasticity with Estimates of the Variance of United Kingdom Inflation." Econometrica, 50(4): pp. 987-1008,1982.
Hartigan, J.A., Wong, M.A., "A K-Means Clustering Algorithm," *Applied Statistics*, vol. 28, pp. 100-108, 1979.
Jain, R., "The Art of Computer Systems Performance Analysis: Techniques for experimental Design, Measurement, Simulation, and Modeling," Wiley-Interscience, NY, 1991.

Kachigan, T.M., "A Multi-Dimensional Approach to Capacity Planning," In Proc. of CMG Conference 1980, Boston, MA, 1980.
Kelly, T. and Zhang, A., "Predicting Performance in Distributed Enterprise Applications," Hewlett-Packard Labs Tech Report, HPL-2006-76, May 2006.
Kelly, T., "Detecting Performance Anomalies in Global Applications," Second Workshop on Real, Large Distributed Systems, WORLDS 2005. San Francisco, Ca., Dec. 2005.
Klerk, L. and Bender, J., "Capacity Planning," URL: http://www.microsoft.com/technet/archive/itsolutions/ecommerce, Microsoft TechNet, 2000.
Menasce, D., Almeida, V., and Dowdy, L., "Capacity Planning and Performance Modeling: from Mainframes to Client-Server Systems," Prentice Hall, 1994.
Ranjan, S. and Rolia, J., Fu, H., and Knightly, E., "QoS-Driven Server Migration for Internet Data Centers," In Proc. of IWQoS 2002, Miami, FL, May 2002.
Rolia, J. and Vetland, V., "Correlating Resource Demand Information with ARM Data for Application Services," In Proc. of the ACM Workshop on Software and Performance, 1998.
Rolia, J., Cherkasova, L., Arlitt, M. and Andrzejak, A., "A Capacity Management Service for Resource Pools," In Proc. of the Fifth Intl. Workshop on Software and Performance, 2005.
Sarris, D. and Hofer, J., "Capacity Planning for e-Commerce Systems With Benchmark Factory," URL: http://www.dlt.com/quest/.
Urgaonkar, B., and G. Pacifici, P. Shenoy, M. Spreitzer, and A. Tantawi; "An Analytical Model for Multi-tier Internet Services and its Applications," In Proc. of the ACM SIGMETRICS'2005, Banff, Canada, Jun. 2005.
Urgaonkar, B., Shenoy, P., Chandra, A., and Goyal, P., "Dynamic Provisioning of Multi-tier Internet Applications," In Proc. of the 2nd IEEE International Conference on Autonomic Computing (ICAC-05), Seattle, Jun. 2005.
Villela, D., Prashant, P., and Rubenstein, D., "Provisioning Servers in the Application Tier for E-Commerce Systems," In Proc. of IWQoS'04, Montreal, Canada, 2004.
Wimmer, M., and V. Nicolescu and D. Gmach and M. Mohr and A. Kemper and H. Kremer; "Evaluation of Adaptive Computing Concepts for Classical ERP Systems and Enterprise Services"; Proceedings of the IEEE Joint Conference on E-Commerce Technology and Enterprise Computing, E-Commerce and E-Services (CEC '06 and EEE '06); San Francisco, California, USA, Jun. 2006.

\* cited by examiner

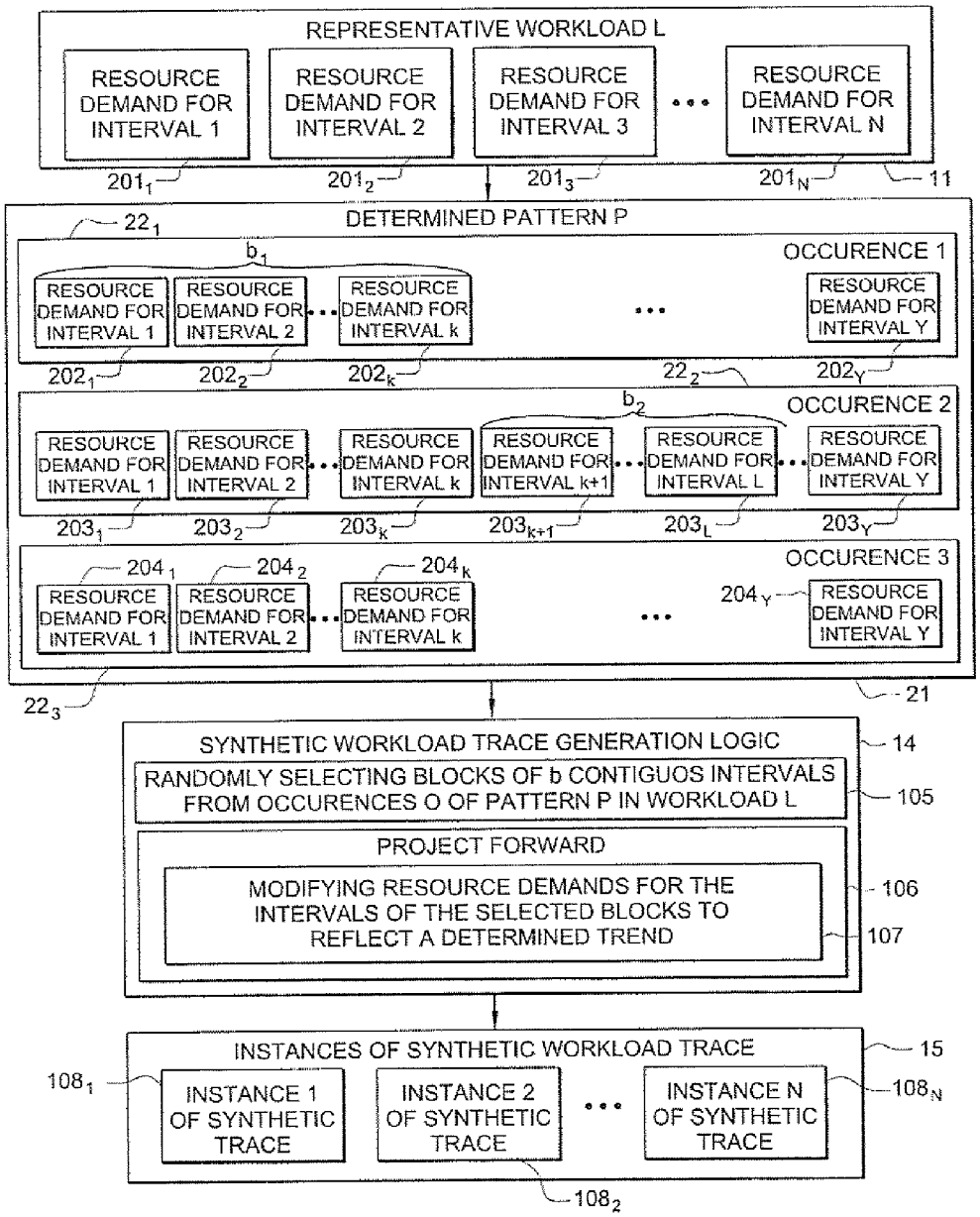

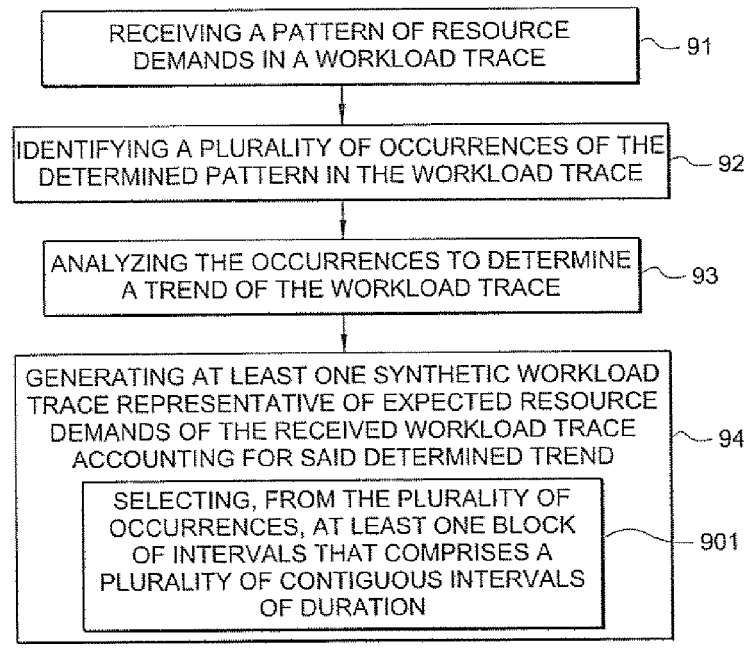
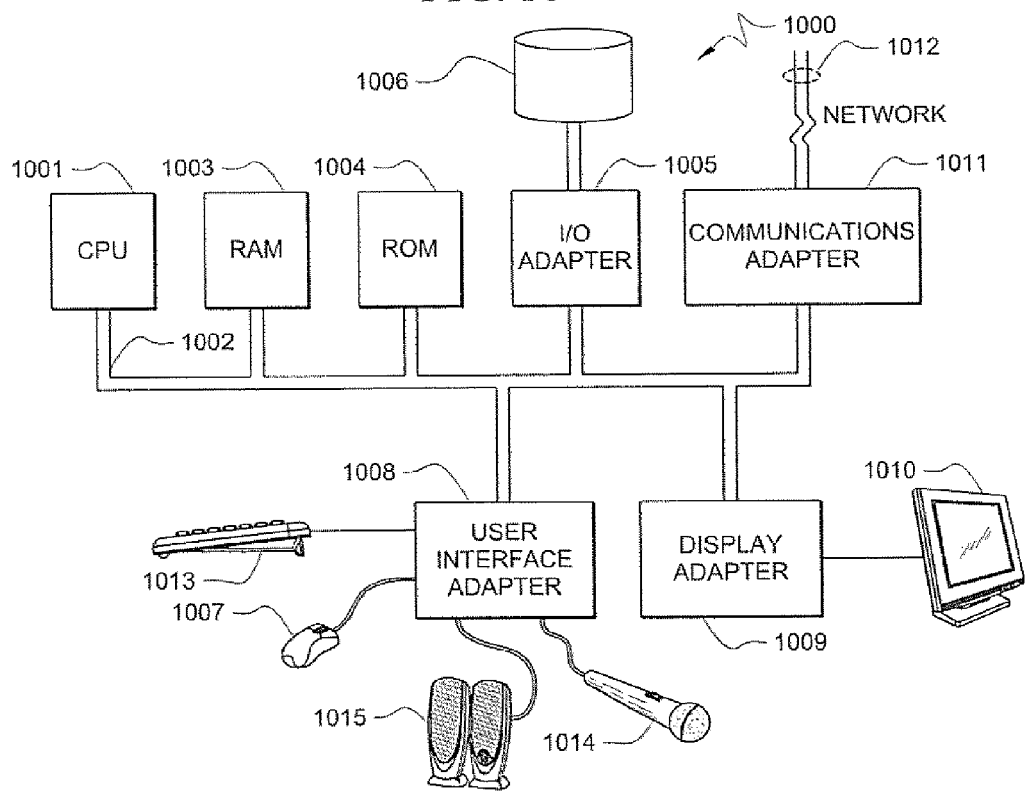

SYSTEM AND METHOD FOR GENERATING SYNTHETIC WORKLOAD TRACES

TECHNICAL FIELD

The flowing description relates generally to generation of synthetic workload traces, and more particularly to systems and methods for generating synthetic workload traces of expected future resource demands by a workload based on representative workload demand patterns.

DESCRIPTION OF RELATED ART

Various computing environments exist in which computing workloads are supported/processed by the computing environment, and a desire generally exists for performing appropriate capacity planning for the computing environment to ensure that the environment has sufficient computing resources for adequately supporting an expected future workload. As a result of capacity planning, a determination may be made regarding whether and to what extent the computing environment's computing resources should be modified (e.g., increased), and/or a determination may be made regarding how many workloads to assign to a given resource of the computing environment. For instance, today computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services, To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Many computing environments contain resource pools that may be shared for supporting a number of different workloads. In general, resource pools are collections of computing resources, such as clusters of servers, racks of blades, or other computing resources that offer shared access to computing capacity. Depending on the granularity of a given implementation, a resource pool may be a collection of separate computing devices (e.g., separate servers, separate clusters of servers etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. Thus, a consumer has a corresponding workload that demands capacity of the computing resource(s). Accordingly, a consumer generally consumes capacity for use in servicing the consumer's workload. Thus, the consumer has a resource "demand" for capacity from the resource pool for servicing its workload in a desired manner. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

When managing resource pools, application workloads may be assigned to resource containers that are then associated with resources in the pool. Management may occur at several different timescales. Long-term management corresponds to capacity planning and takes place over many months. Over a medium-timescale, e.g. hours, days or months, groups of resource containers are found that are expected to share resources well. These containers are then assigned to their corresponding resources. Capacity management tools can be used to automate such a process. Once resource containers are assigned to a resource, a workload manager for the resource governs access to resource capacity over short time scales, e.g. 15 seconds. A workload manager can provide static allocations of capacity or change the per-resource container allocations based on time-varying workload demand.

In the distant past, data centers were made up of small numbers of large mainframe computers that each hosted several application workloads with many users. Capacity planning experts helped to ensure that sufficient aggregate capacity was available just in time, as it was needed. With the advent of distributed computing, new application workloads were typically assigned to their own smaller servers. The incremental cost of capacity from smaller servers was much less expensive than the incremental cost of capacity on mainframes. Capacity planners would often anticipate al application's workload demands two years in advance and pre-provision a new server with sufficient capacity so that the workload could grow into it. However, the explosive growth in both enterprise computing and Internet computing has led to server sprawl in data centers. Enterprise data centers are typically full of large numbers of lightly utilized servers that incur high cost of ownership including facilities cost, such as rent and power for computing and cooling, high software licensing cost, and high cost for human management activities. Many enterprises are now beginning to exploit resource pools of servers supported by virtualization mechanisms that enable multiple application workloads to be hosted on each server. Different mechanisms have capabilities and characteristics that distinguish their purpose within data centers. Known virtual machine technologies, such as Xen, VMware, etc., enable configuration isolation, e.g., virtual machines may execute different operating systems and/or operating system versions while sharing the same physical host. Furthermore, some virtualization mechanisms (e.g., Xen, VMware) provide the ability to dynamically migrate virtual machines from one physical machine to another without interrupting application execution. Different products have different capabilities and different performance overheads.

The primary motivation for enterprises to adopt such technologies is increased flexibility, the ability to quickly repurpose server capacity to better meet the needs of application workload owners, and to reduce overall costs of ownership. Unfortunately, the complexity of these environments presents additional management challenges. There are many workloads, a finite number can be hosted by each server, and each workload has capacity requirements that may frequently change based on business needs. Capacity management methods are not yet available to manage such pools in a cost-effective manner. Accordingly, a desire exists for techniques for accurately and cost-effectively performing capacity planning analysis. In particular, a desire exists for systems and methods for generating a synthetic workload that is fairly representative of a future projection of a given workload (e.g., with consistent characteristics as the workload that it represents) that is expected to be encountered by the resource pool such that the synthetic workload can be used for future capacity planning analysis for the pool.

BRIEF DESCRIPTION OF THE DRAWINGS

FIG. 3 shows an exemplary system that illustrates a technique employed by one embodiment of the present invention for generating an accurate representation of resource demands in synthetic workload traces;

FIG. 9 shows another operational flow diagram according to an embodiment of the present invention; and FIG. 10 shows an exemplary system on which certain embodiments of the present invention may be implemented.

DETAILED DESCRIPTION

Figure 1:
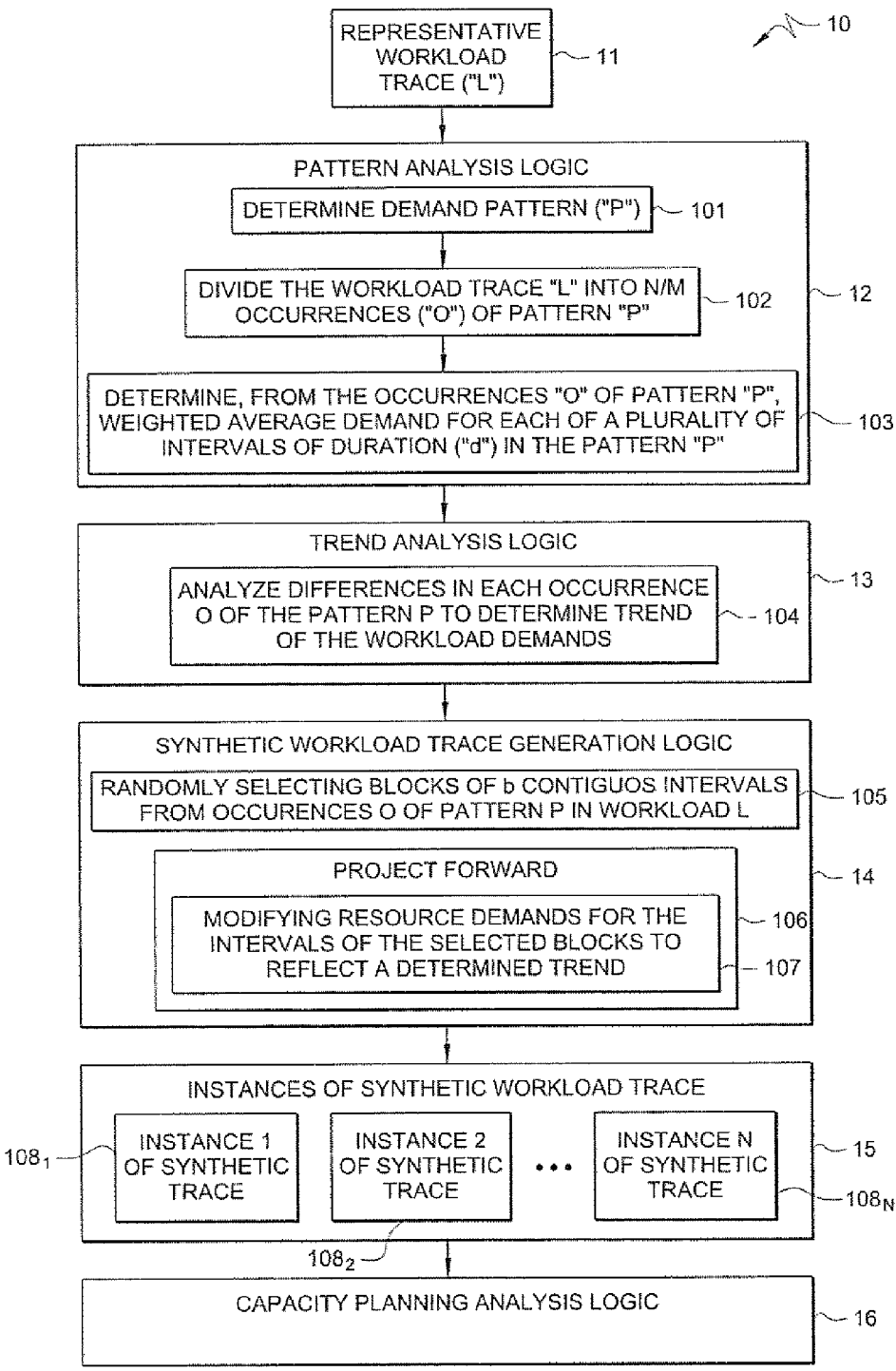
FIG. 1 shows an exemplary system according to an embodiment of the present invention.

Various embodiments of the present invention are now described with reference to the above figures, wherein like reference numerals represent like parts throughout the several views. As described further below, the present invention provides systems and methods for generating synthetic workload traces that are representative of future resource demands expected to be encountered by a computing system for a workload. Such synthetic workload traces may thus be used in capacity planning for the computing system.

According to certain embodiments, systems and methods for generating synthetic workload traces based on representative workload demand patterns are provided. That is, according to certain embodiments, a representative workload that reflects resource demands of a workload over a period of time, such as over a 6-month period of time, is evaluated to determine resource demand patterns, if any, that are present within the workload. Such representative workload may, in some instances, be an actual historical workload of resource demands observed for a computing system. The patterns observed may be cyclic, repeating patterns of resource demands, such as hourly, daily, weekly, monthly, etc. According to certain embodiments, the determined resource demand pattern for a workload is used in generating synthetic workload traces.

Further, according to certain embodiments, the representative workload is evaluated to determine a trend of the workload's resource demands, such as whether the workload's resource demands are increasing or decreasing over time, etc. In certain embodiments, the trend is determined by analyzing occurrences of the determined pattern within the representative (e.g., historical) workload. For instance, differences between various occurrences of the determined pattern within the representative workload may be evaluated to determine the trend of the workload's resource demands. From the determined trend, certain embodiments of the present invention may determine how the workload's resource demands are expected to change in the future. As such, the determined trending information may be used for forecasting what the workload's resource demands are likely to be in the future. Thus, according to certain embodiments, the determined trending information is taken into account in generating the synthetic workload trace(s) so that the generated synthetic workload traces are representative of the resource demands that are likely expected in the future.

According to certain embodiments, synthetic workload traces that are representative of future resource demands expected to be encountered by a computing system for a workload are generated in a manner such that the synthetic workload traces maintain characteristics consistent with the workload being represented. For instance, not only are total resource demands and peak resource demands for occurrences of a pattern represented in the synthetic workload traces, but also such characteristics regarding contiguous resource demands that are encountered over a plurality of monitoring intervals in occurrences of the pattern are also represented in the synthetic workload traces consistent with the representative workload. As mentioned above, a pattern may be a repeating pattern of resource demands by a workload over some period of time, such as an hourly period, daily period, weekly period, monthly period, etc. Within each occurrence of such a pattern's period, there exists a plurality of resource demand measurement intervals. For instance, within a given occurrence of a pattern within a representative workload (e.g. a historical workload), there exists a plurality of intervals (e.g., 5-minute intervals, etc.) with corresponding measurement of resource demands of the workload made during each interval. According to certain embodiments, in forming the synthetic workload traces, a block of a plurality of contiguous intervals are randomly selected from the occurrences of the pattern in the representative workload (e.g., historical workload), and such block is used in forming the synthetic workload traces in a manner that maintains the internal demands of an occurrence of the pattern in the synthetic trace consistent with the internal demands of occurrences of the pattern in the representative workload (e.g., historical workload). In this manner, not only may the total resource demands made by an occurrence of the pattern and the peak resource demands made by an occurrence of the pattern be accurately represented in the synthetic workload trace, but also the internal resource demands made across contiguous intervals of time within the pattern are accurately represented in the synthetic workload trace.

According to certain embodiments, multiple instances of synthetic workload traces are generated so that the performance risks associated with a range of demand variations can be assessed. According to certain embodiments, a capacity management process is provided for resource pools, which makes use of the generated synthetic workload traces to enable capacity planners to match supply and demand for resource capacity in a just in time manner. It is expected that capacity planners will desire to maintain more capacity than required, but this extra amount of capacity would be motivated by the consequences to the enterprise of resource failures or unanticipated demands within a pool.

When managing resource pools, there are numerous capacity management questions that may be desired to be answered to ensure that resources are used effectively. For example: how much capacity is needed to support the current workloads? Which workloads should be assigned to each resource? What is the performance impact of workload scheduler and/or policy settings that govern sharing? How should workloads be assigned to make workload scheduler and/or policy settings most effective? What should be done when a resource doesn't have sufficient capacity to meet its workloads' needs? How many resources will be needed over a planning horizon?

Certain embodiments of the present invention make use of generated synthetic workload traces to reduce the effort, and hence cost, needed to make best use of computing resources (e.g., data center resources) while managing the risks of over and under provisioning.

FIG. 1 shows an exemplary system 10 according to an embodiment of the present invention. As shown in this example, a representative workload 11, which may be referred to as workload trace "L", of a computing system that is under analysis is received by pattern analysis logic 12. Representative workload trace 11 represents resource demands of a given workload (e.g., a given application, etc.) over some period of time, such as over a 3-month or 6-month period. The representative workload 11 may, in some embodiments, be data representing an actual historical workload encountered by the system under analysis. Thus, embodiments of the present invention may be employed to analyze an actual ("live") workload encountered by a deployed system, which may enable more accurate analysis and planning for the system. That is, representative workload 11 may comprise data representing resource demands of an actual historical workload collected for a computing system over a given period of time, say a preceding 6-month period, for example.

Actual historical workload data (e.g., for forming representative workload trace 11) may be collected through well-known application logs and system usage metrics, such as CPU utilization measured at defined time intervals (e.g., 5 minutes or so). As one example, the data collected in access logs generated by Hewlett-Packard's Open View Operations Center application server may be used in forming representative workload trace 11 according to certain embodiments. Other types of access logs (e.g., utilization capacity attributes, such as CPU, memory, network, and disk I/O), which may be customized for their respective applications, may be used for collecting a live workload in accordance with embodiments of the present invention.

The representative workload trace 11 may include data that reflects an amount of resource demands of the workload over a period of time, such as over a 6-month period. In certain embodiments, the representative workload trace 11 may comprise a plurality of intervals within the period of monitored time, such as 5-minute intervals within the 6-month monitored period, and data may be provided reflecting the corresponding amount of resource demands made by the workload during each interval. Such resource demands may comprise a demand for utilization of any resource of the computing system, such as an amount of utilization of CPU, memory, I/O resources, network bandwidth resources, etc. of the computing system for performing the desired tasks of the workload. In certain embodiments of the present invention, the resource demands that are of interest are processing demands (e.g., CPU demands), and thus the resource demand data in the representative workload trace 11 may reflect the corresponding processing demands (e.g., CPU utilization) for each of the plurality of intervals in the monitoring period of time. Of course, in other embodiments, the resource demands may additionally or alternatively reflect demands by the workload for other computing resources, such as memory utilization, I/O access, network bandwidth access, etc.

Thus, representative workload trace 11 may comprise the above-mentioned data, which is stored to a computer-readable medium, such as memory, hard drive, peripheral data storage drive, optical data storage (e.g., CD, DVD, etc.), magnetic data storage, tape storage, etc. Representative workload trace 11 may be stored in the form of any suitable data structure, such as to a database, file, table, etc. Again, in certain embodiments, such data may represent resource demands of an actual historical workload encountered by a computing system under analysis.

Pattern analysis logic 12 receives the representative workload trace 11 with N measurement intervals and analyzes such representative workload trace 11 to determine, in operational block 101, a pattern "P," if any, of resource demands that exists within the representative workload trace 11. The determined resource demand pattern "P" may be a cyclic, repeating pattern of the resource demands that occurs within the representative workload trace 11, such as an hourly, daily, weekly, monthly, etc., cyclic pattern. For instance, a pattern "P" may be a pattern having a duration that corresponds to M measurement intervals, wherein M is less than N.

According to certain embodiments of the present invention, pattern analysis logic 12 further uses the determined resource demand pattern "P" to, in operational block 102, identify a number of occurrences of the pattern "P" within the representative workload trace 11. That is, pattern analysis logic 12 may divide the representative workload trace 11 with N measurement values into a number of N/M complete occurrences ("O") of the determined pattern "P," as discussed further herein below.

Further, according to certain embodiments of the present invention, pattern analysis logic 12 determines, in operational block 103, from the determined occurrences "O" of pattern "P", a weighted average resource demand for each of a plurality of intervals of duration within the pattern "P". For instance, pattern "P" may be a daily pattern (i.e., a cyclic pattern that repeals daily), and within each occurrence of the daily pattern in the representative workload trace 11, there may exist a number of intervals (e.g., 5-minute intervals) for which resource demand data is available. For example, there exist 288 5-minute intervals within a 24-hour period, and thus for each occurrence of a daily pattern "P" in the representative workload trace 11, there may be 288 5-minute intervals with corresponding resource demand data for each interval. The weighted average provides a model for the pattern that can be used to illustrate expected pattern behavior to an operator and to support forecasting exercises where an operator may desire to perturb the pattern for the purpose of sensitivity analysis, for example. Having a single pattern (i.e., the weighted average) to work with makes it easier to specify changes.

Further, in certain embodiments system 10 further comprises trend analysis logic 13, which is operable to analyze the determined pattern "P" to determine a trend in the workload, wherein such trend may be used for projecting (e.g., estimating) the future resource demands of the workload. For instance, the representative workload trace 11 for the preceding 6 months may be analyzed to determined occurrences of a pattern "P" of resource demands, and trend analysis logic 13 may further analyze the occurrences of pattern "P" within the representative workload trace 11 to determine a trend that may be used for projecting (e.g., estimating) the resource demands of the workload trace that are expected for the upcoming 6 months (or other future period of time). For example, as shown in the operational block 104, according to certain embodiments of the present invention, trend analysis logic 13 analyzes differences in each occurrence "O" of the pattern "P" in the representative workload 11 to determine a trend of the workload resource demands.

According to certain embodiments of the present invention, system 10 comprises synthetic workload trace generation logic 14 that is operable to generate one or more synthetic workload traces 15 that are representative of an expected future resource demands of the workload under analysis (i.e., the workload for which representative workload trace 11 was captured). As discussed further herein, it is generally desirable for the generated synthetic workload trace to possess characteristics consistent with those of the workload that the trace is intended to represent. Thus, for accurate capacity planning analysis, not only are such characteristics as total resource demands and peak resource demands that occur within an occurrence of a pattern P desired to be properly reflected, but other characteristics of the underlying trace, such as the internal resource demands within the pattern P should be accurately represented in the synthetic workload trace. For instance, a pattern in which resource demands are high for a plurality of contiguous intervals and are then low for a plurality of contiguous intervals may not be accurately represented (e.g., for capacity planning purposes) by a synthetic workload trace which evenly distributes the resource demands across the pattern, even though the total resource demands and peak resource demands may be accurately represented by the synthetic workload trace. Thus, it is desirable to accurately represent, in a synthetic workload trace, the internal characteristics of a given pattern, such as the resource demands that are persistent over a plurality of contiguous intervals within the pattern. Accordingly, as discussed further herein, in certain embodiments, synthetic workload trace generation logic 14 randomly selects, in operational block 105, blocks of "b" contiguous intervals from occurrences "O" of pattern "P" in the representative workload trace 11. While this is described as a "random" selection of blocks, in certain embodiments, the random selection may be based on weights from the weighted average determined in block 103. Thus, the randomness of the selection may, in certain embodiments, be influenced by certain factors, such as the weighted average determined in block 103.

Synthetic workload trace generation logic 14 then projects the pattern of resource demands forward, in operational block 106, in order to determine a synthetic workload trace that is representative of future-expected resource demands of the workload under analysis. In doing so, synthetic workload trace generation logic 14 may, in operational block 107, modify resource demands for the intervals of the selected blocks to reflect a trend (as determined by trend analysis logic 13) in generating the resource demands of the synthetic workload trace(s) 15.

In certain embodiments, synthetic workload trace generation logic 14 repeats to generate a plurality of instances of synthetic workload traces, such as instances $108_1$, $108_2$, ... $108_N$ shown in FIG. 1. As described further herein, such plurality of instances may enable analysis of a range of possible resource demands that may be encountered in the future for the workload tinder analysis, thus allowing the risks associated with such possible resource demand traces to be considered.

As with the representative workload trace 11, the generated synthetic workload trace(s) 15 (e.g., each instance $108_1$-$108_N$ of such synthetic workload trace) may thus comprise data reflecting corresponding amount of resource demands expected (e.g., in each of a plurality of intervals) for the workload over a future period of time, which is stored to a computer-readable medium, such as memory, hard drive, peripheral data storage drive, optical data storage (e.g., CD, DVD, etc.), magnetic data storage, tape storage, etc. Generated synthetic workload trace(s) 15 may be stored in the form of any suitable data structure, such as to a database, file, table, etc.

According to certain embodiments, system 10 further comprises capacity planning analysis logic 16 that receives the generated synthetic workload trace(s) 15 for one or more workloads under analysis and analyzes the capacity of the resources of a computing system for supporting such synthetic workload traces. In this manner, the capacity of a given computing system for supporting expected future resource demands of a given workload that is under analysis can be evaluated. Further, a plurality of workloads can be evaluated to determine which workloads may best share a given resource, etc. For instance, by evaluating generated synthetic workload traces for a plurality of different workloads, capacity planning analysis logic can determine how the resource demands of the different workload traces interact, such as whether the resource demand peaks of the different workload traces occur simultaneously. As a result, the aggregate resource demands for serving the different workloads can be evaluated for determining an optimal assignment of the different resources to various shared resources (e.g., determining which resources are best for sharing a given resource, etc.)

Various elements of exemplary system 10, such as pattern analysis logic 12, trend analysis logic 13, synthetic workload trace generation logic 14, and capacity planning analysis logic 16 may be implemented as computer-executable software code stored to a computer-readable medium and/or as hardware logic, as examples.

Figure 2:
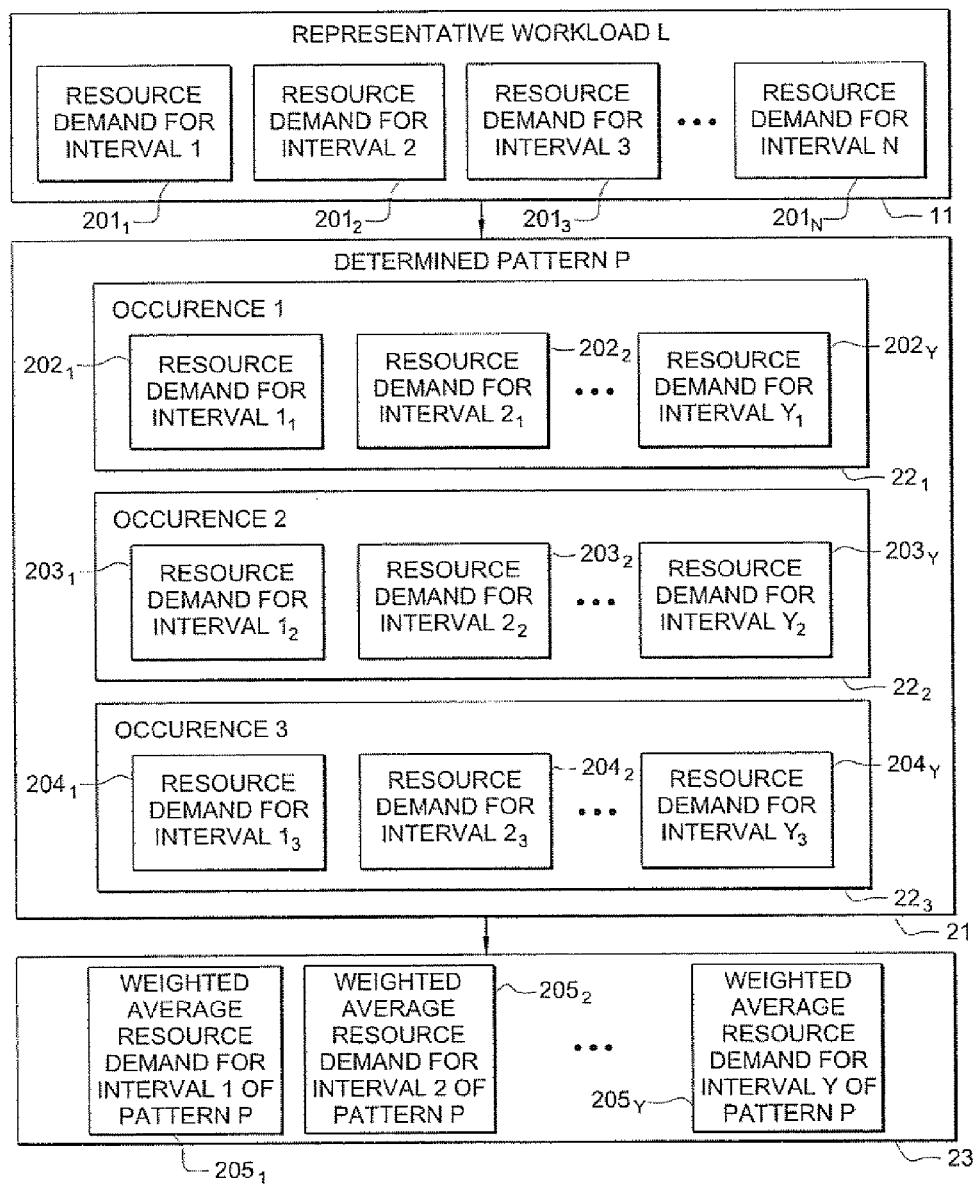
FIG. 2 shows a block diagram illustrating an exemplary technique for analyzing occurrences of a determined resource demand pattern for determining weighted average resource demands for each of a plurality of intervals present in each occurrence, according to one embodiment of the present invention.

FIG. 2 shows a block diagram illustrating an exemplary technique for analyzing occurrences of a determined resource demand pattern for determining weighted average resource demands for each of a plurality of intervals present in each occurrence, according to one embodiment of the present invention. As shown in FIG. 2, representative workload trace 11 includes a plurality of measurement intervals $201_1$, $201_2$, $201_3$, ..., $201_N$, each with a corresponding amount of resource demand (e.g., CPU utilization) of the workload. As mentioned above, a resource demand pattern "P" 21 may be determined from the representative workload trace 11, and as shown in FIG. 2 a plurality of occurrences $22_1$, $22_2$, $22_3$, ..., etc., of such pattern "P" may be identified in the representative workload trace 11. Each occurrence of the pattern "P" may include a plurality of resource demand measurement intervals. For instance, if the pattern "P" is a daily pattern and the measurement intervals $201_1$-$201_N$ are each 5-minute intervals, then there exists 288 of such measurement intervals in each occurrence of the daily "P", pattern. In the example of FIG. 2, each occurrence of the pattern P includes Y resource demand measurement intervals, wherein Y is any number greater than 1. So, occurrence $22_1$ of pattern "P" includes resource demand measurement intervals $202_1$, $202_2$, ..., $202_Y$ (e.g., the Y resource demand intervals of the first occurrence of the pattern P identified in representative workload 11); occurrence $22_2$ of pattern "P" includes resource demand measurement intervals $203_1$, $203_2$, ..., $203_Y$; and occurrence $22_3$ of pattern "P" includes resource demand measurement intervals $204_1$, $204_2$, ..., $204_Y$.

A weighted average resource demand 23 of the occurrences 221-223 of the pattern P is derived from an analysis of the occurrences of such pattern d More specifically, a weighted average of the resource demands is derived for each of the Y intervals present in the occurrences of the pattern P. Thus, a weighted average resource demand $205_1$ for interval 1 of the occurrences of the pattern P is determined, a weighted average resource demand $205_2$ for interval 2 of the occurrences of the pattern P is determined, and so on through a weighted average resource demand $205_Y$ being determined for interval Y of the occurrences of the pattern P. Thus, weighted average resource demand $205_1$ is determined from analysis of the resource demands present in intervals $202_1$, $203_1$, and $204_1$ of occurrences $22_1$-$22_3$ of pattern P. Similarly, weighted average resource demand $205_2$ is determined from analysis of the resource demands present in intervals $202_2$, $203_2$, and $204_2$ of occurrences $22_1$-$22_3$ of pattern P; and so on. Exemplary techniques that may be employed in certain embodiments for determining the weighted average resource demands for the intervals present in the occurrences of the pattern P are described further herein. As mentioned above, the determined weighted average resource demands may be used to facilitate operator based forecasting and/or for weighting the random selections of blocks of contiguous intervals within an occurrence of a pattern, as examples.

As mentioned above, according to certain embodiments of the present invention, synthetic workload trace generation logic 14 is operable to generate synthetic workload traces that maintain an accurate representation of resource demands that occur internally within occurrences of a resource demand pattern. FIG. 3 shows an exemplary system 30 that illustrates a technique employed by one embodiment of the present invention for generating such an accurate representation of resource demands in synthetic workload traces. As discussed above with FIG. 2, representative workload 11 includes a plurality of resource demand measurement intervals $201_1$-$201_N$. Further, as discussed above with FIG. 2, a plurality of occurrences $22_1$-$22_3$ of the pattern P are identified in the representative workload 11, wherein each occurrence comprises Y resource demand measurement intervals.

According to one embodiment, synthetic workload trace generation logic 14 randomly selects, in operational block 105, blocks of "b" contiguous intervals from the identified occurrences of pattern P. Thus, as shown in FIG. 3, in forming a first instance of a synthetic workload trace (e.g., trace $108_1$), synthetic workload generation logic 14 randomly selects a first block "$b_1$" of K contiguous resource demand intervals $202_1$-$202_K$ from one of the occurrences, in this case occurrence $22_1$, of pattern P. Further blocks of contiguous resource demand intervals may be selected in forming such first instance of a synthetic workload trace. For instance, in the illustrated example, synthetic workload generation logic 14 randomly selects a second block "$b_2$" of a plurality of contiguous resource demand intervals $203_{K+1}$-$203_L$ from one of the occurrences, in this case occurrence $22_2$, of pattern P. The selected blocks of contiguous intervals are used in forming the synthetic workload trace (e.g., trace $108_1$) as described further herein.

According to one embodiment, the number of "K" contiguous intervals in a block relates to overload epochs of duration "s" for a workload 11 where a contiguous sequence of demand values exceeds some threshold that may relate to a service level agreement. For example, for some workload the CPU demand may be greater than 80% utilization for 4 consecutive 5-minute measurement intervals. "K" may be chosen to represent a high percentile of the longest overload epochs for a workload trace 11. In one embodiment, "K" contiguous intervals may correspond to a duration that is equal to the longest overload epoch. In another embodiment, it may correspond to a percentile, such as a 95-percentile, for the duration of such epochs. The full synthetic trace may be formed by appending successively generated blocks. The number of blocks generated may be chosen to match the desired forecast duration, e.g., one week, two months, etc., into the future.

As mentioned above, it may be desirable to predict future resource demands of a given workload. A workload demand prediction service may serve one or more of at least three purposes: i) to recognize whether a workload's demands change significantly over time; ii) to support the generation of synthetic demand traces that represent future demands for each workload (e.g., demands for several weeks or months into the future) to support capacity planning exercises; and, iii) to provide a convenient model (e.g., using the above-mentioned weighted average model) that can be used to support forecasting exercises. Exemplary techniques that may be employed according to embodiments of the present invention for implementing a workload demand prediction service are described further below.

Demand prediction can be performed for various future time periods, such as short-term (e.g., the next 5 minutes), mid-term (e.g., the next couple of weeks), and long-term (e.g., the next 6 months). Generally, for capacity management/planning analysis, predicting workload demands for at least a couple of weeks up to several months is generally desired. Furthermore, detailed time-dependent information about the behavior of the workloads is generally desired for performing such capacity planning analysis. Therefore, certain embodiments of the present invention provides long-term workload demand prediction by analyzing the cyclical behavior of a workload's observed demands, extract patterns of the workload's demands, and predict the future demands of the workload.

In the area of short-term prediction, models like ARMA (see e.g., G. E. P. Box, C. Jenkins and G. Reinsel. *Time Series Analysis: Forecasting and Control*. Prentice Hall, Upper Saddle River, N.J., USA, third edition, 1994) or GARCH (see e.g., R. F. Engle. Autoregressive Conditional Heteroscedasticity with Estimates of the Variance of United Kingdom Inflation. *Econometrica*, 50(4):987-1008, 1982) might work very well. But, in the case of longer forecasts, their predictions converge fast against the mean value. Thus, different techniques are desired, particularly for long-term prediction.

Any suitable technique may be employed by pattern analysis logic 12 for evaluating a historical workload 11 and recognizing a pattern "P" of resource demands within such historical workload 11. According to one embodiment, pattern analysis logic 12 employs a three-stage approach to recognize a likely pattern "P" within historical workload 11, see e.g., M. Wimmer and V. Nicolescu and D. Gmach and M. Mohr and A. Kemper and H. Kremar, "Evaluation of Adaptive Computing Concepts for Classical ERP Systems and Enterprise Services," *Proceedings of the IEEE Joint Conference on E-Commerce Technology and Enterprise Computing, E-Commerce and E-Services* (CEC'06 and EEE'06), San Francisco, Calif., USA, June 2006, the disclosure of which is hereby incorporated herein by reference. In the first phase, many hypothetical patterns are found. In the second phase, trends are computed using techniques described further in co-pending and commonly-assigned U.S. patent application Ser. No. 11/742, 519 titled "SYSTEM AND METHOD FOR EVALUATING A PATTERN OF RESOURCE DEMANDS OF A WORKLOAD", the disclosure of which is hereby incorporated herein by reference. Finally, in the third phase, the hypothetical patterns are evaluated and a recommendation is made regarding the most likely pattern for the workload. The recommendation may be that the workload is periodic with a certain cycle time or a-periodic such that no clear cycle time was found. In both cases the trend is also reported.

One exemplary implementation of pattern analysis logic 12 is now briefly described. Given a historic workload trace $L=(l(t_n))_{1 \le n \le N}$ which is represented by N contiguous demand values $l(t_n)$, pattern analysis logic 12 may extract a demand pattern $P=(p(t_m))_{1 \le m \le M, M \le N/2}$ with M contiguous demand values $p(t_m)$ with the assumption that the workload has a cyclic behavior. This assumption is evaluated in a later classification phase. According to a classical additive component model, a time series includes a trend component, a cyclical component, and a remainder, e.g., characterizing the influence of noise. According to this exemplary implementation, the trend is a monotonic function, modeling an overall upward or downward change in demand.

Figure 4A:
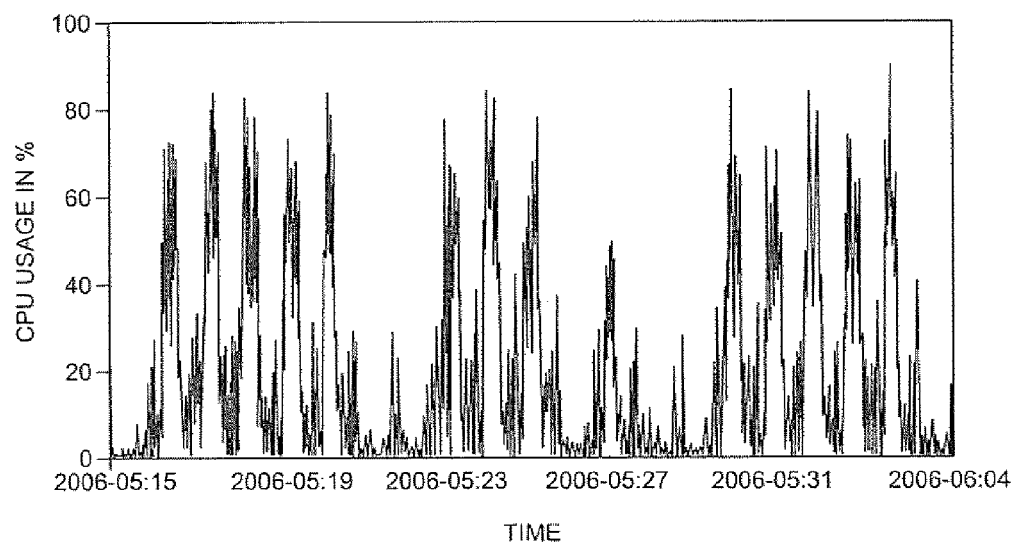
FIG. 4A shows a graph for an exemplary three-week historical workload demand trace.

The process for extracting a representative demand pattern from a historical workload that is employed by this exemplary implementation of pattern analysis logic 12 is illustrated with FIGS. 4A-4D. FIG. 4A illustrates a graph for a three-week historical workload demand trace. Note that in this example there was a public holiday during the second week of the trace.

Figure 4B:
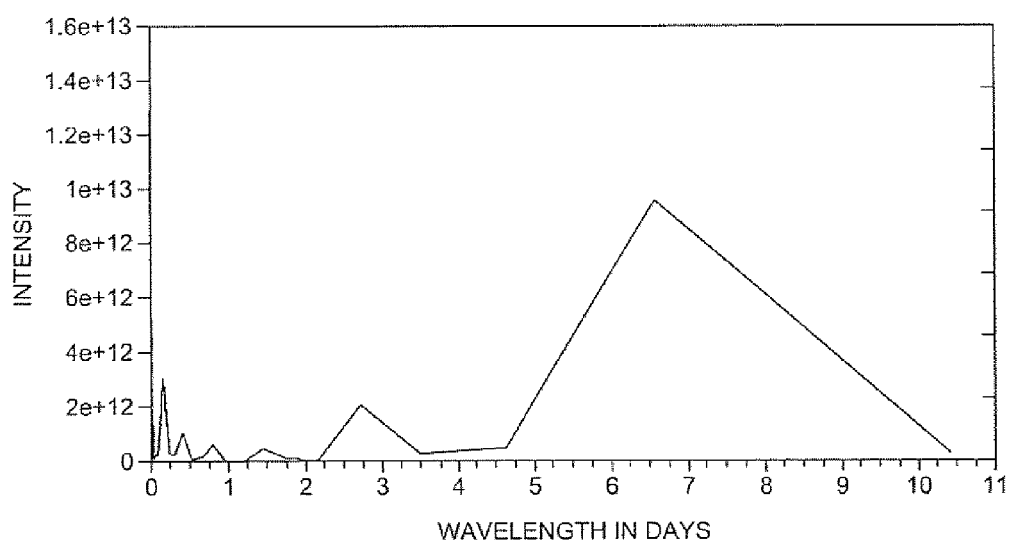
FIG. 4B shows a graph illustrating a periodogram of the exemplary three-week historical workload demand trace of FIG. 4A.

To start the analysis of this exemplary embodiment, pattern analysis logic 12 identifies the cyclical component that describes the periodic characteristics of the workload. To determine the yet unknown duration, M, of the pattern, pattern analysis logic 12 begins with an evaluation of the workload's periodogram function, as shown in the graph of FIG. 4B. A Fourier transformation gives an overlay of harmonics for the time-varying magnitude of demand. The periodogram shows the intensity, I, with which a harmonic of a wavelength $\lambda$ is present in the workload. The most dominant frequencies provide information about the duration of a potential pattern.

Intuitively, if the periodogram function has a local maximum at $\lambda>0$, then it is likely that there exists a representative pattern of length $\lambda$. In general, it is not the case that the wavelength with the global maximum, named $max_1$, is most representative. Thus, according to this exemplary embodiment, pattern analysis logic 12 determines a set $\Lambda=\{\lambda_1, \ldots, \lambda_k\}$ of local maxima positions, with $I(\lambda_i) > max_1/2$ for every $1 \le i \le k$. For instance, in the periodogram in FIG. 4B, detect two local maxima are detected. The first maximum proposes a wavelength of 1 day and the second maximum proposes one at 7 days.

Figure 4C:
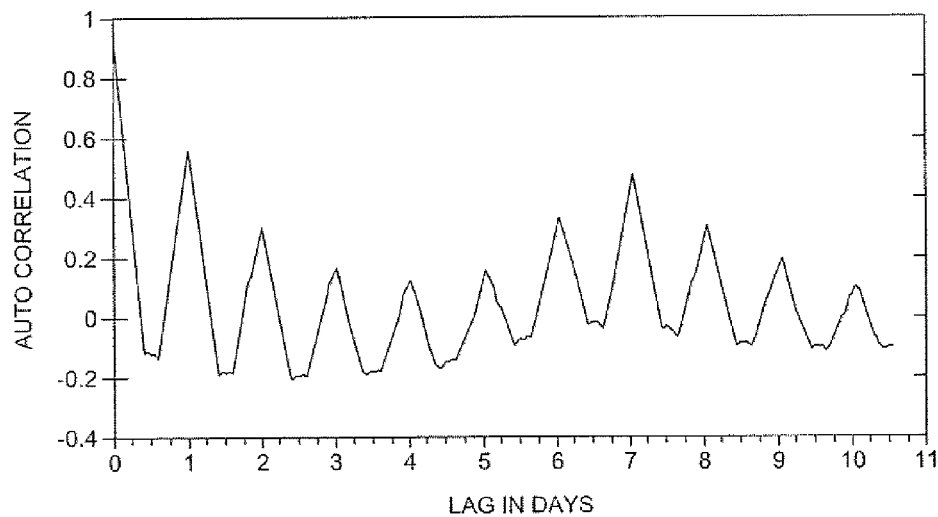
FIG. 4C shows a graph illustrating auto-correlation of the exemplary historical workload demand trace of FIG. 4A.

In addition to the periodogram, pattern analysis logic 12, according to this exemplary embodiment, calculates the auto-correlation function for the workload demand trace. For a formal definition and further details on auto-correlation unction, see G. E. P. Box, G. Jenkins and G. Reinsel. *Time Series Analysis: Forecasting and Control*. Prentice Hall, Upper Saddle River, N.J., USA, third edition, 1994. FIG. 4C shows a graph illustrating the auto-correlation function for the workload. It describes dependencies within the workload curve, i.e., the similarity between the workload and the workload shifted by a lag g. A high value $\rho$ for the auto-correlation at lag g denotes that the $\rho$ workload curve shifted by g looks similar to the original one. Thus, if the auto-correlation shows local extrema at multiples of a lag g, it is a strong indicator that there exists a temporal dependency of length g. In the same way as with the periodogram, pattern analysis logic 12, according to this exemplary embodiment, determines a set of hypotheses by $\{\lambda_{i+1}, \ldots, \lambda_{k+h}\}$ of significant local extreme positions and add them to the set $\Lambda$.

Workloads from enterprise data centers typically show a periodicity which is a multiple of hours, days, weeks, and so forth. Due to unavoidable computational inaccuracies and influences of irregular events and noise, the wavelengths in $\Lambda$ can diverge slightly from these typical periods. Thus, according to certain embodiments, a comparison to calendar-specific periods is performed to determine for every wavelength candidate $\lambda_i$ the best matching multiple of hours, days, and weeks and augment $\Lambda$ with corrected wavelengths so that they are also considered.

In the second phase of this exemplary embodiment, pattern analysis logic 12 selects the best candidate wavelength $\Lambda'$ from the $\lambda_i \in \Lambda$. For each $\lambda_i$, pattern analysis logic 12 computes the average magnitude for $\rho$ at multiples of $\lambda_i$. For example, if $\lambda_i = 1$ day, then pattern analysis logic 12 takes the average of $\rho_i$ from observations at lags of one day. If $\lambda_i = 7$ days, then pattern analysis logic 12 takes the average of $\rho_i$ from observations at lags of seven days. If the workload exhibits a pattern with length $\lambda_i$, then the workload after shifting it by multiples of $\lambda_i$ is similar to itself and thus the auto-correlation function exhibits high values at the lags $\{v \cdot \lambda_i | v \in N^+\}$. The average magnitude $\bar{\rho}_i$ is a measure of similarity among cyclic repetitions in demand for $\lambda_i$. For the example in FIG. 4C, $\lambda_i = 7$ days has the highest average magnitude $\bar{\rho}'$ as compared to other values for $\lambda_i$ and is thus recognized as the best pattern length. This implies that the pattern length is M=2016 intervals of duration d=5 minutes (note that there are 288 5-minutes intervals per day). It should be noted that FIG. 4C does not illustrate lags beyond 11 days, even though they are included in the computation.

The chosen value for the pattern length of M intervals is used to calculate the pattern $P=(p(t_m))_{1 \le m \le M}$ for the workload. First, according to this exemplary embodiment of pattern analysis logic 12, the pattern analysis logic 12 defines occurrences for the pattern and then defines the pattern's demand values $(p(t_m))$. Given M, the workload L is divided into N/M complete occurrences and possibly one partial occurrence, as in operational block 102 of FIG. 1. Let O be the occurrences of the pattern for o≤N/M+1. Thus, occurrence o is a subtrace of the trace L with values $l^o(t_m)=l(t_{m+o\cdot M})$ for each 1≤m≤M. For every interval $t_m$ in the pattern, pattern analysis logic 12 calculates a weighted average $\rho(t_m)$ for the interval, as in operational block 103 of FIG. 1. In this exemplary embodiment, the weighted average is computed using intervals $t_m$ from the occurrences O of the pattern. Thus, in this embodiment, we define a weight, $W_{o,m}$, for each occurrence o and interval m as:

$$w_{o,m} = \frac{l^o(t_m)}{\sum_o l^o(t_m)}.$$

With these weights, the weighted average demand for each interval $t_m$ is computed as $\rho(t_m)=\Sigma_o w_{o,m} \cdot l^o(t_m)$. The resulting weighted average may be used to emphasize the importance of larger values over smaller values for capacity management.

Figure 4D:
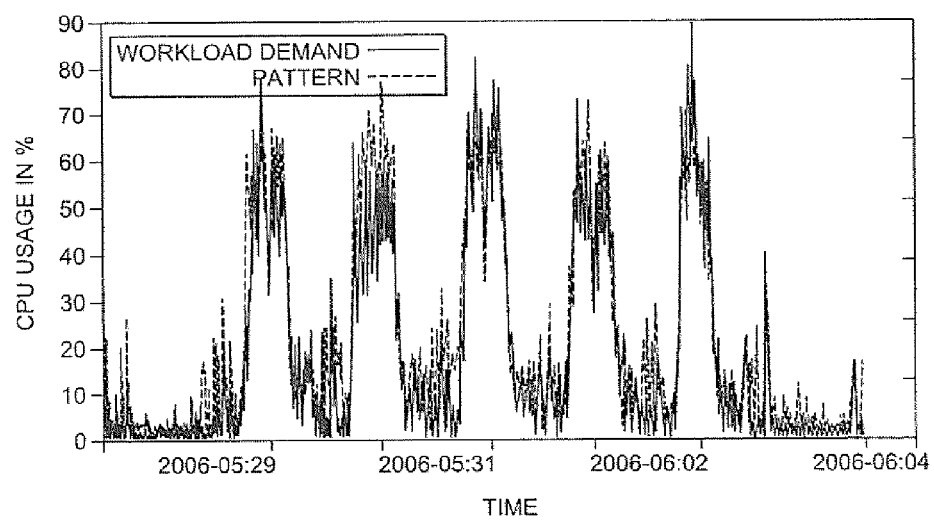
FIG. 4D shows a graph illustrating an extracted resource demand pattern determined for the exemplary historical workload demand trace of FIG. 4A.

FIG. 4D shows the pattern and an occurrence of the pattern together in one diagram. It should be noted that the curves closely resemble one another.

In the next phase of this exemplary embodiment, trend analysis logic 13 analyzes the trend of the historical workload trace 11. For this, trend analysis logic 13 calculates the overall deviation of each occurrence of the pattern from the original workload L. Let $c_m^o$ be the difference between the $\rho(t_m)$ and the demand value for interval $t_m$ in the occurrence o. We define $c^o$ as the aggregate demand difference of occurrence o with respect to the pattern P as: $c^o=\Sigma_{l\leq m\leq M}(\rho(t_m)-l^o(t_m))$. Further, we define the trend τ as the gradient of the linear least squares fit through the values $c^o$ for the occurrences O as ordered by time (see e.g., N. R. Draper and H. Smith. *Applied Regression Analysis*. John Wiley & Sons, New York, N.Y., USA, third edition, 1998). The trend τ estimates the rate of change of demand over time with respect to the pattern.

The classification phase decides which workloads have periodic behavior. The classification is based on two measures for the quality of the pattern. The first measure is $\bar{p}'$ from above. Larger values for $\bar{p}'$ imply a better quality of fit. The second measure characterizes the difference between occurrences O and the pattern. The difference is computed as the average absolute error $$\zeta = \frac{\sum_{1\leq m\leq M_o}|p(t_m)-l^o(t_m)|}{N}$$

between the original workload and the pattern P. Smaller differences suggest a better quality of pattern.

To classify the quality of patterns for a large number of workloads, certain embodiments employ a k means cluster algorithm (see e.g., J. A. Hartigan and M. A. Wong. A K-Means Clustering Algorithm. In *Applied Statistics*, vol. 28, pp. 100-108, 1979) with clustering attributes ζ and $\bar{p}'$. The algorithm partitions the patterns into three groups that we interpret as having strong, medium, or weak patterns. Weak patterns are regarded as a periodic because no clear cycle could be deduced for the trace. A trace of extended duration may provide insight into longer cycles.

An exemplary embodiment of synthetic workload trace generation logic 14 is now described. In this embodiment, synthetic workload trace generation logic 14 employs a novel process for generating a synthetic trace to represent a future workload demand trace L' for some time period in the future. Typically, traces are generated to represent demands for a time period that is several weeks or months into the future. The general goal for a synthetic trace, according to this embodiment, is to capture the highs and lows of demand and contiguous sequences of demand. These are important characteristics for accurately modeling a workload's ability to share resource capacity with other workloads and to model required capacity for the workload. Furthermore, this exemplary embodiments supports the ability to introduce an observed trend or forecast information.

To generate an occurrence o' for L', this exemplary embodiment relies on the historical pattern occurrences O. A value $l^{o'}(t_m)$ is chosen randomly from the corresponding $t_m$ values from O. Given a sufficiently large number of future occurrences O', synthetic workload trace generation logic 14 will obtain the same time-varying distribution of demands as in O. This results in a pattern of demands that captures the lows and highs of demand in a representative way. Furthermore, we note that the occurrences may have a trend τ. For the sequence of historical pattern occurrences, synthetic workload trace generation logic 14 normalizes the demand values so that the trend is removed with respect to the last occurrence before constructing O'.

Unfortunately, this approach may not necessarily offer the same required capacity as the original occurrences. To better model required capacity, it becomes desirable to take into account sequences of contiguous demands in the trace L. This exemplary embodiment of synthetic workload trace generation logic 14 accomplishes this by randomly selecting blocks of b intervals $t_m, t_{m+1}, \ldots, t_{m+b}$ at a time from the occurrences O. In this way, the synthetically generated traces 15 have contiguous sequences of demand that are similar to the historical trace 11. Preferably, the value b should be larger than the number of intervals in the greatest overload epoch s so that the impact of continuous demands are fully realized when evaluating required capacity.

Demands $l^{o'}(t_m)$ in the synthetic trace are augmented to reflect the trend τ. In this exemplary embodiment, we assume an additive model. For each future occurrence o', synthetic workload trace generation logic 14 computes an absolute value based on τ that is to be added to each demand in occurrence o'. The further o' is into the future, the greater the change with respect to the historical data, assuming τ is not zero.

According to one embodiment, the capacity planning analysis steps are repeated using multiple randomly generated instances of L', such as instances $108_1$-$108_N$ of FIG. 1 to better characterize the range of potential behavior for the overall system. Multiple instances better characterize future interactions in demands among multiple workloads. By analyzing a range of possible behaviors we gain insight into the risks of performance degradation.

Finally, a workload pattern P based on a weighted average provides a convenient way to express what-if-scenarios and business forecasts that are not observable to us from historic data. Suppose, for example, that we have a pattern P with O occurrences and we require a change to the pattern; then, we can express a change once with respect to P rather than once for each of the possibly many O occurrences of pattern P.

Figure 5:
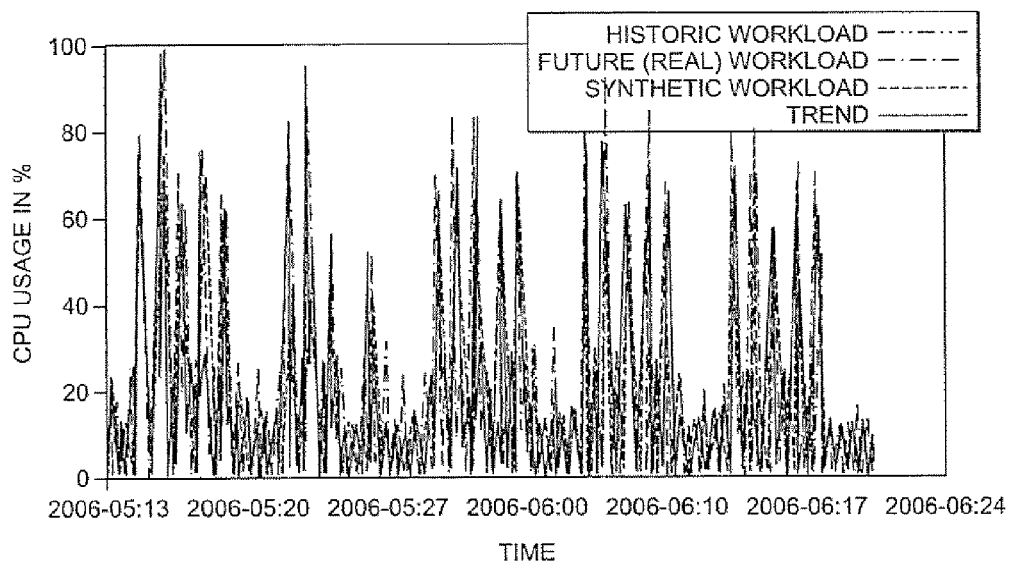
FIG. 5 shows a graph illustrating historical, synthetic, and future workload demands for an exemplary case study.

Now, an exemplary case study is briefly described to illustrate the representativeness of a synthetic workload trace generated using the above-described exemplary embodiment. In this case study, we use three weeks of historic data from May 14 through June 4 to generate a synthetic trace for the next two weeks, using trending, and compare the characteristics with that of the actual workload data for the following two weeks, namely June 5 through June 18. FIG. 5 shows the corresponding historical, synthetic, and future workload demands. The trend is clearly useful at this timescale.

Figure 6:
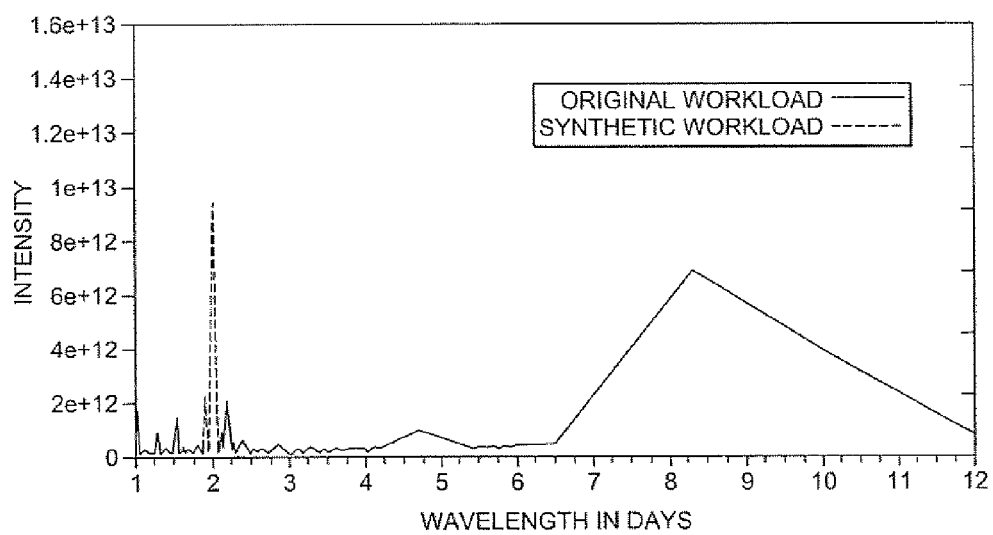
FIG. 6 shows a graph comparing the periodogram of the original workload trace and a generated synthetic workload trace for this exemplary case study.
Figure 7:
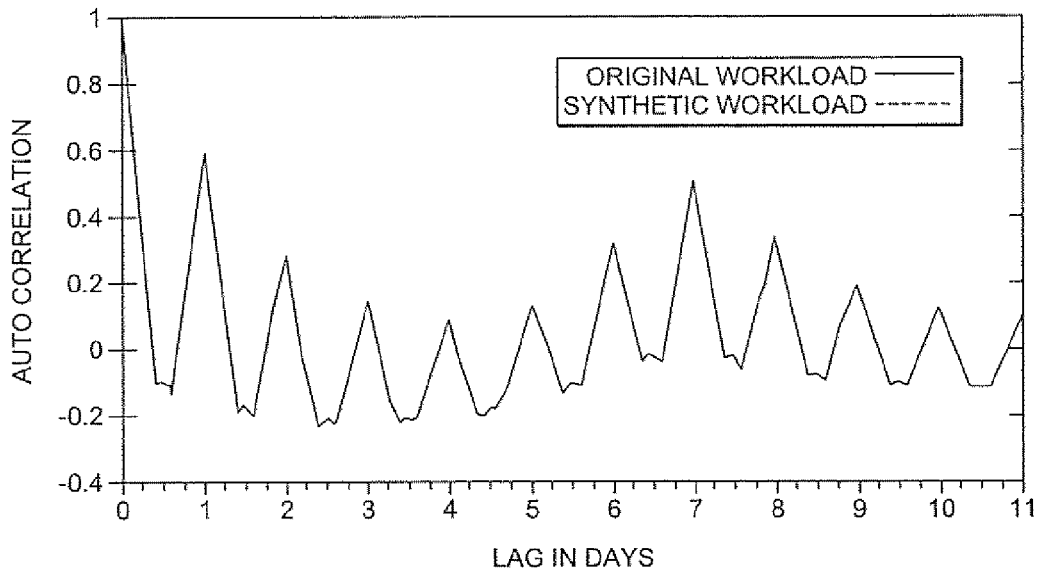
FIG. 7 shows a graph comparing the auto-correlation of the original workload trace and a generated synthetic workload trace for this exemplary case study.

To further assess the representativeness of the synthetic trace as compared with the historic data for this exemplary case study, we see that FIGS. 6 and 7 show that the periodogram and auto-correlation functions for the two data sets are very similar. Finally, the required capacity values for the historic, synthetic, and actual future workload demands were 508, 455, and 461 units of demand, respectively. Thus the synthetic trace has both a similar pattern and required capacity as the actual demand trace it aimed to predict.

Figure 8:
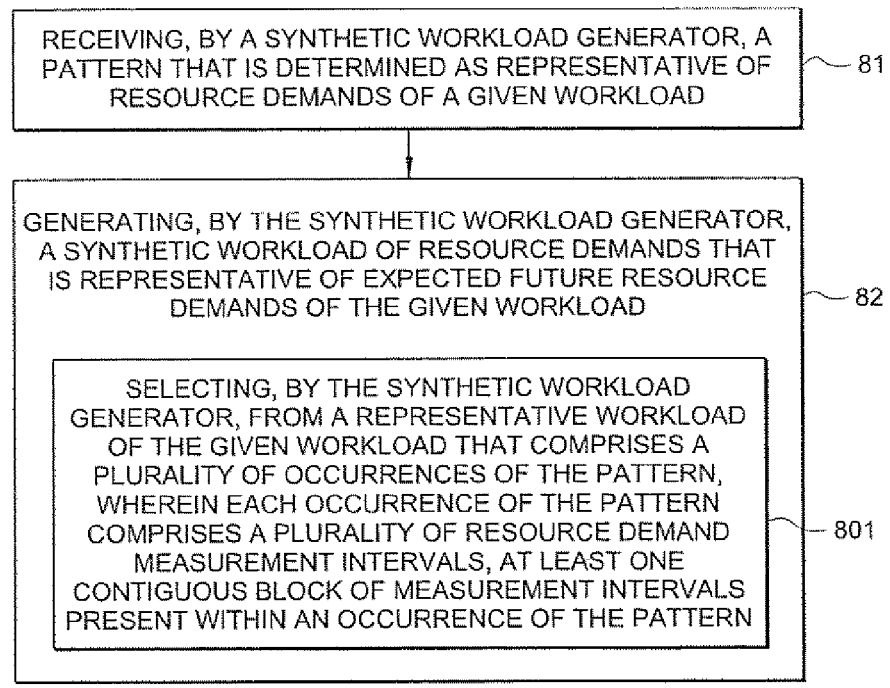
FIG. 8 shows an operational flow diagram according to one embodiment of the present invention.

FIG. 8 shows an exemplary operational flow diagram according to one embodiment of the present invention. In operational block 81, a synthetic workload generator (e.g., synthetic workload trace generation logic 14 of FIG. 1) receives a pattern P that is determined as representative of resource demands of a given workload such as workload "L" 11 of FIG. 1. In block 82, the synthetic workload generator generates a synthetic workload of resource demands (e.g., synthetic workload trace(s) 15 of FIG. 1) that is representative of expected future resource demands of the given workload. The generating operation (block 82) comprises operational block 801 in which the synthetic workload generator selects, from a representative workload (e.g., workload L 11 of FIG. 1) of the given workload that comprises a plurality of occurrences of the pattern (e.g., occurrences $22_1$-$22_3$ of FIG. 2), wherein each occurrence of the pattern comprises a plurality of resource demand measurement intervals (e.g., occurrence $22_1$ of FIG. 2 comprises resource demand measurement intervals $202_1$-$202_Y$), at least one contiguous block of measurement intervals present within an occurrence of the pattern. As mentioned above, by selecting such a contiguous block of measurement intervals, the characteristics of the resource demands within a resource demand pattern can be accurately reflected within the synthetic workload that is generated.

FIG. 9 shows an exemplary operational flow diagram according to another embodiment of the present invention. In this example, a pattern P of resource demands in a workload trace (e.g., workload trace L 11 of FIG. 1) is received (e.g., by pattern analysis logic 12), in operational block 91. In operational block 92, a plurality of occurrences of the determined pattern that are present in the workload trace are identified (e.g., by the pattern analysis logic 12). In operational block 93, the occurrences are analyzed (e.g., by trend analysis logic 13) to determine a trend of the workload trace. In operational block 94, at least one synthetic workload trace (e.g., workload trace(s) 15 of FIG. 1) are generated (e.g., by synthetic workload trace generation logic 14 of FIG. 1) that are representative of expected resource demands of the received workload trace accounting for the determined trend. The generating operation (block 94) comprises operational block 901 in this example in which such generating comprises selecting, from the plurality of occurrences, at least one block of intervals that comprises a plurality of contiguous intervals of duration. Again, by selecting such a contiguous block of measurement intervals, the characteristics of the resource demands within a resource demand pattern can be accurately reflected within the synthetic workload that is generated.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 10 illustrates an exemplary computer system 1000 on which various elements of embodiments of the present invention, such as pattern analysis logic 12, trend analysis logic 13, synthetic workload trace generation logic 14, and/or capacity planning analysis logic 16, may be implemented according to certain embodiments of the present invention. Central processing unit (CPU) 1001 is coupled to system bus 1002. CPU 1001 may be any general-purpose CPU. The present invention is not restricted by the architecture of CPU 1001 (or other components of exemplary system 1000) as long as CPU 1001 (and other components of system 1000) supports the inventive operations as described herein. CPU 1001 may execute the various logical instructions according to embodiments of the present invention. For example, CPU 1001 may execute machine-level instructions according to the exemplary operational flows described above in conjunction with FIGS. 8-9.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for operations of the pattern analysis logic 12, trend analysis logic 13, synthetic workload trace generation logic 14, and/or capacity planning analysis logic 16. Communications adapter 1011 is preferably adapted to couple computer system 1000 to network 1012, which may enable information to be input to and/or output from system 1000 via such network 1012 (e.g., the Internet or other wide-area network, a local-area network, a public or private switched telephony network, a wireless network, any combination of the foregoing). User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, display information pertaining to capacity planning analysis, according to certain embodiments of the present invention.

It shall be appreciated that the present invention is not limited to the architecture of system 1000. For example, any suitable processor-based device may be utilized for implementing pattern analysis logic 12, trend analysis logic 13 synthetic workload trace generation logic 14, and/or capacity planning analysis logic 16, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method executed by a computer system programmed to evaluate workload demands on a set of resources, the method comprising:
   with a synthetic workload generator of said computer system, identifying a pattern within historical data of actual resource demands of a given workload; and
   generating, with the synthetic workload generator, a synthetic workload of resource demands that is representative of expected future resource demands of the given workload, wherein the generating comprises:
   selecting, with the synthetic workload generator, at least one contiguous block of resource demand measurement intervals present within an occurrence of the pattern from said historical data of the given workload, in which the historical data comprises a plurality of occurrences of the pattern, wherein each occurrence of the pattern comprises a plurality of resource demand measurement intervals.

2. The method of claim 1 further comprising, simulating operation of said set of resources to process said synthetic workload of resource demands.

3. The method of claim 1 wherein the generating comprises:
   generating a plurality of instances of said synthetic workload of resource demands.

4. The method of claim 1 wherein the resource demands are memory usage demands.

5. The method of claim 1 wherein the resource demands are input/output (I/O) resource utilization demands.

6. The method of claim 1 further comprising:
   analyzing the generated synthetic workload of resource demands for performing capacity planning for a computer system to which future resource demands of the given workload are to be made.

7. The method of claim 1 wherein said selecting said at least one contiguous block of measurement intervals comprises:
   randomly selecting K contiguous resource demand measurement intervals from the occurrences of the pattern to include in said at least one contiguous block, wherein K comprises any number greater than 1.

8. The method of claim 7 wherein said K number of contiguous intervals in said at least one contiguous block is determined based on determined overload epochs of duration "s" present in the representative workload.

9. The method of claim 7 wherein said K number of contiguous intervals in said at least one contiguous block is determined to correspond to a duration of a longest overload epoch present in the representative workload.

10. The method of claim 1 further comprising:
    determining, from the plurality of occurrences of the pattern, a weighted average demand for each of a plurality of resource demand measurement intervals present in each of the occurrences.

11. The method of claim 10 further comprising:
    randomly selecting K contiguous resource demand measurement intervals from the occurrences of the pattern to include in said at least one contiguous block, wherein K comprises any number greater than 1, and wherein said randomly selecting is influenced by the determined weighted average demand.

12. The method of claim 1 further comprising:
    with trend analysis logic of said computer system, analyzing the occurrences of the pattern to determine a trend of the given workload's resource demands.

13. The method of claim 12 further comprising:
    wherein said generating the synthetic workload of resource demands that is representative of expected future resource demands of the given workload reflects said determined trend.

14. A method executed by a computer system programmed to evaluate workload demands on a set of resources, the method comprising:
    with said computer system, identifying a pattern of resource demands in a workload trace;
    with said computer system, identifying a plurality of occurrences of the pattern in the workload trace;
    with said computer system, analyzing the occurrences to determine a trend of the workload trace by comparing different occurrences of said pattern; and
    with said computer system, generating at least one synthetic workload trace representative of expected resource demands of the received workload trace accounting for said determined trend.

15. The method of claim 14 wherein said generating comprises selecting, from the plurality of occurrences, at least one block of intervals that comprises a plurality of contiguous intervals of duration.

16. A physical computing system comprising: a processor; pattern analysis logic operable to receive a representative trace of resource demands of a given workload, identify a pattern of resource demands present in the received representative trace, and identify a plurality of occurrences of the identified pattern present in the received representative trace;
    trend analysis logic operable to analyze the occurrences of the identified pattern to determine a trend of the resource demands of the given workload; and
    synthetic workload trace generation logic operable to generate at least one synthetic workload trace that is representative of expected resource demands of the given workload accounting for said determined trend.

17. The system of claim 16 wherein said synthetic workload trace generation logic is operable to select, from the plurality of occurrences of the identified pattern, at least one block of a plurality of contiguous resource demand measurement intervals.

18. The system of claim 16 wherein said pattern analysis logic comprises computer-executable software code stored to a computer-readable media, which when executed by a computer causes the computer to perform the recited operability of the pattern analysis logic.

19. The system of claim 16 wherein said trend analysis logic comprises computer-executable software code stored to a computer-readable media, which when executed by a computer causes the computer to perform the recited operability of the trend analysis logic.

20. The system of claim 16 wherein said synthetic workload trace generation logic comprises computer-executable software code stored to a computer-readable media, which when executed by a computer causes the computer to perform the recited operability of the synthetic workload trace generation logic.

* * * * *